(12) United States Patent
Yamashita (10) Patent No.: US 6,426,792 B1
(45) Date of Patent: Jul. 30, 2002

(54) OPTICAL CHARACTERISTIC MEASURING APPARATUS, THE METHOD THEREOF AND RECORDING MEDIUM

(75) Inventor: Tomoyu Yamashita, Saitama (JP)

(73) Assignee: Advantest Corporation, Tokyo (JP)

( * ) Notice: Subject to any disclaimer, the term of this patent is extended or adjusted under 35 U.S.C. 154(b) by 0 days.

(21) Appl. No.: 09/901,149

(22) Filed: Jul. 10, 2001

(30) Foreign Application Priority Data

Jul. 10, 2000 (JP) ........................................ 2000-207913

(51) Int. Cl.[7] .............................................. G01N 21/00
(52) U.S. Cl. ...................................................... 356/73.1
(58) Field of Search ...................... 356/73.1; 385/11–12, 385/32, 24; 250/227.25, 227.11; 359/161–173, 124, 179

(56) References Cited

U.S. PATENT DOCUMENTS

| | | | |
|---|---|---|---|
| 4,984,884 A | | 1/1991 | Ryu et al. |
| 4,997,277 A | * | 3/1991 | Horiguchi et al. ......... 356/73.1 |
| 5,723,857 A | * | 3/1998 | Underwood et al. ... 250/227.14 |
| 6,081,323 A | * | 6/2000 | Mahgerefteh et al. ..... 356/73.1 |

FOREIGN PATENT DOCUMENTS

JP          1-291141          11/1989

* cited by examiner

*Primary Examiner*—Frank G. Font
*Assistant Examiner*—Tu T. Nguyen
(74) *Attorney, Agent, or Firm*—Lowe Hauptman Gilman & Berner, LLP (57) ABSTRACT

The object of the present invention is to provide an apparatus that can perform measurement of chromatic dispersion, even if the wavelength of variable-wavelength light source and that of fixed-wavelength light source for reference are identical with each other. The variable-wavelength light generated by a variable-wavelength light source 12 is subjected to intensity modulation to a frequency f by a first optical modulator 15a and transmitted from one end 30a to the other end 30b of an optical fiber 30. The fixed-wavelength light generated by a fixed-wavelength light source 14 is subjected to intensity modulation to a frequency f by a second optical modulator 15b and transmitted from the other end 30b to the one end 30a of optical fiber 30. Therefore, it is possible to separately obtain the variable-wavelength light and fixed-wavelength light transmitted through the optical fiber 30 using a second directional coupler 28 and a first directional coupler 26, respectively, regardless of wavelengths thereof. Accordingly, it is also possible to perform the comparison of phase and measurement of chromatic dispersion, even if the wavelengths of variable-wavelength light source and fixed-wavelength light source for reference are identical with each other.

9 Claims, 4 Drawing Sheets

OPTICAL CHARACTERISTIC MEASURING APPARATUS, THE METHOD THEREOF AND RECORDING MEDIUM

BACKGROUND OF INVENTION

1. Field of Invention

The present invention relates to measurement of chromatic dispersion characteristics of a DUT (Device Under Test) such as an optical fiber, and in particular to a technique for measuring dispersion characteristics without being influenced by the expansion and contraction of the DUT.

2. Description of the Related Art

When measuring chromatic dispersion characteristics of a device-under-test (DUT) such as an optical fiber and the like, it is desired that the measurement can be performed while excluding the influence of expansion and contraction of the DUT. A technique for measuring the DUT without being influenced by the expansion and contraction thereof is disclosed, for example, in Japanese Patent Laid-Open No. Hei 1-291141.

Figure 4:
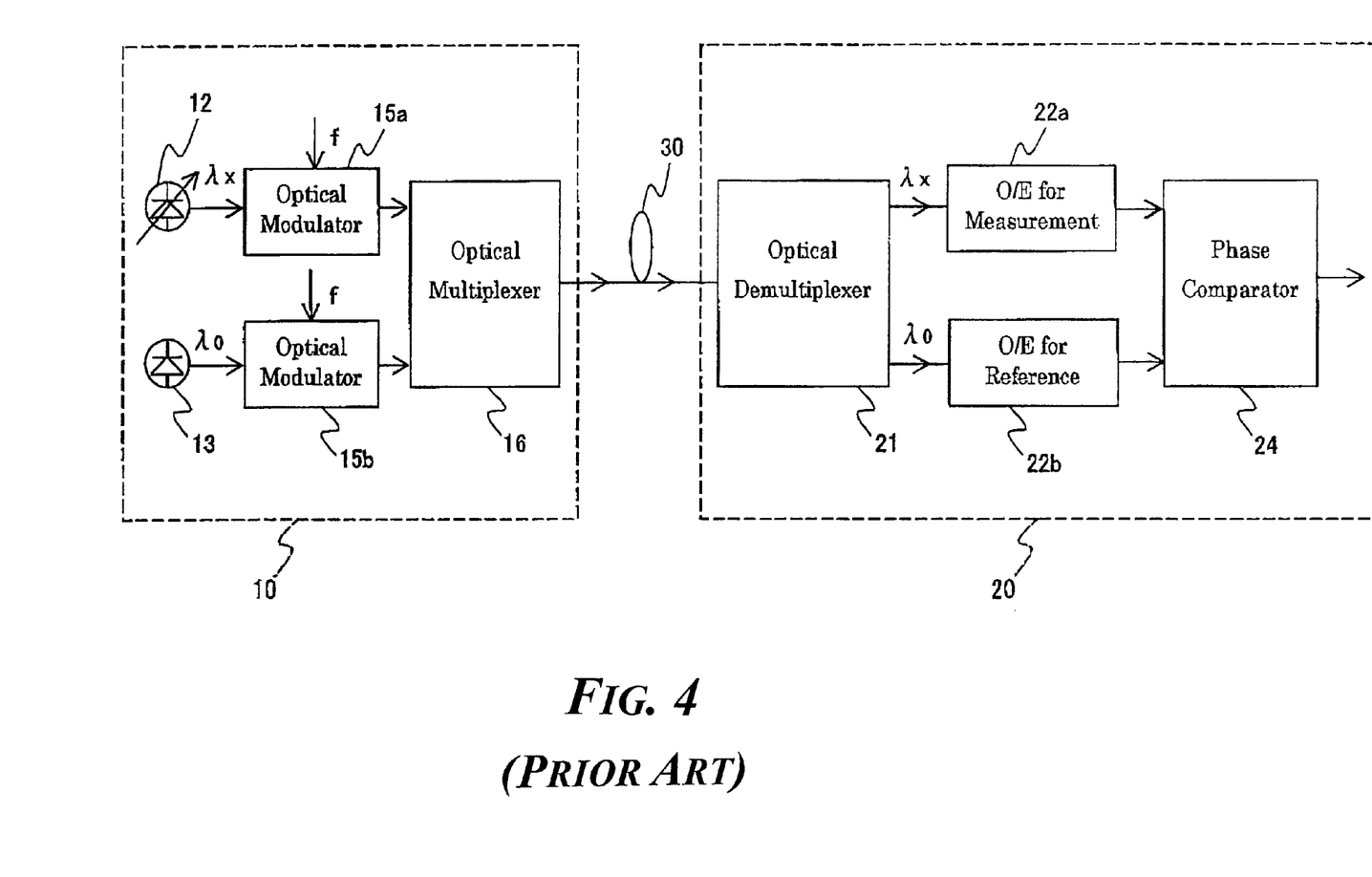
FIG. 4 is a block diagram showing the construction of a system for measuring a chromatic dispersion characteristic of a device-under-test (DUT) such as an optical fiber, in the prior art.

The construction of a measuring system is shown in FIG. 4. As shown in FIG. 4, the measuring system is divided into a light source system 10 and a characteristic measuring system 20. A variable-wavelength light source 12 of light source system 10 changes the wavelength, so that a light of wavelength $\lambda x$ (variable-wavelength light) is generated. A fixed-wavelength light source 13 fixes the wavelength, so that a light of wavelength $\lambda 0$ (fixed-wavelength light) is generated. And, $\lambda 0$ is the wavelength at which the chromatic dispersion is minimized in an optical fiber 30. The variable-wavelength light and fixed-wavelength light are modulated by an optical modulator 15a and an optical modulator 15b, respectively, to a frequency f, and multiplexed in an optical multiplexer 16.

The light multiplexed in the optical multiplexer 16 is entered into the optical fiber 30. The light transmitted through the optical fiber 30 is entered into an optical demultiplexer 21 of the characteristic measuring system 20. The optical demultiplexer 21 divides the light transmitted through the optical fiber 30 into a light of wavelength $\lambda x$ and a light of wavelength $\lambda 0$. A photoelectric converter for measurement 22a and a photoelectric converter for reference 22b perform photoelectric conversion of the light of wavelength $\lambda x$ and the light of wavelength $\lambda 0$, respectively, and a phase comparator 24 detects the phase difference between outputs of the photoelectric converter for measurement 22a and the photoelectric converter for reference 22b.

The transmitted light of wavelength $\lambda x$ is influenced by the chromatic dispersion, and the expansion and contraction of optical fiber 30. The transmitted light of wavelength $\lambda 0$ is influenced only by the expansion and contraction of optical fiber 30. This is because $\lambda 0$ is the wavelength at which the chromatic dispersion is minimized in the optical fiber 30. Therefore, if the phase difference between the transmitted light of wavelength $\lambda x$ and the transmitted light of wavelength $\lambda 0$ is detected, it is possible to exclude the influence caused by the expansion and contraction of optical fiber 30.

SUMMARY OF INVENTION

However, in order to allow the optical demultiplexer 21 to divide the light transmitted through the optical fiber 30 into the light of wavelength $\lambda x$ and the light of wavelength $\lambda 0$, the wavelength $\lambda x$ and the wavelength $\lambda 0$ should be somewhat separated. It is difficult for wavelength bands of wavelength $\lambda x$ and wavelength $\lambda 0$ to be common. For example, the wavelength $\lambda x$ is from 1525 to 1635 nm and the wavelength $\lambda 0$ is 1300 nm, so that the wavelength $\lambda x$ and the wavelength $\lambda 0$ should be somewhat separated.

Therefore, the object of the present invention is to provide an apparatus that can perform measurement of chromatic dispersion, even if the wavelength of variable-wavelength light source and that of fixed-wavelength light source for reference are identical with each other.

According to the present invention described in claim 1, an apparatus for measuring optical characteristics of a device-under-test which transmits a light, includes: a variable-wavelength light source for generating a variable-wavelength light, the wavelength of which is variable; a fixed-wavelength light source for generating a fixed-wavelength light, the wavelength of which is fixed; a first optical modulation unit for casting an incident light for measurement on one end of the device-under-test, wherein the incident light for measurement is the variable-wavelength light subjected to intensity modulation to a predetermined frequency; a second optical modulation unit for casting an incident light for reference to the other end of the device-under-test, wherein the incident light for reference is the fixed-wavelength light subjected to intensity modulation to a predetermined frequency; a transmitted light obtaining unit for measurement that obtains a transmitted light for measurement, which is the incident light for measurement transmitted through the device-under-test; and a transmitted light obtaining unit for reference that obtains a transmitted light for reference, which is the incident light for reference transmitted through the device-under-test, wherein the apparatus measures the characteristics of device-under-test based on the transmitted light for measurement and the transmitted light for reference.

According to the optical characteristic measuring apparatus constructed as explained in the above, the variable-wavelength light is transmitted from the one end to the other end of the device-under-test, whereas the fixed-wavelength light is transmitted from the other end to the one end of the device-under-test. Therefore, it is possible to separate and obtain the variable-wavelength light and fixed-wavelength light transmitted through the device-under-test regardless of their wavelengths. Therefore, it is possible to measure the chromatic dispersion even if the wavelength of variable-wavelength light source is identical with the fixed-wavelength light source for reference.

According to the present invention described in claim 2, an apparatus for measuring optical characteristics of a device-under-test which transmits a light, includes: a transmitted light obtaining unit for measurement that obtains a transmitted light for measurement which is an incident light for measurement, transmitted through the device-under-test, wherein the incident light for measurement is a variable-wavelength light, the wavelength of which is variable, subjected to intensity modulation to a predetermined frequency and then cast on one end of the device-under-test; a transmitted light obtaining unit for reference that obtains a transmitted light for reference which is an incident light for reference, transmitted through the device-under-test, wherein the incident light for reference is a fixed-wavelength light, the wavelength of which is fixed, subjected to intensity modulation to a predetermined frequency and then cast on the other end of the device-under-test; a photoelectric conversion unit for measurement that performs photoelectric conversion of the transmitted light for measurement obtained by the transmitted light obtaining unit for measurement; a photoelectric conversion unit for reference that performs photoelectric conversion of the transmitted light for reference obtained by the transmitted light obtaining unit for reference; a phase comparison unit for detecting a phase difference between the phase of output of the photoelectric conversion unit for measurement and the photoelectric conversion unit for reference; and a characteristic calculation unit for calculating group delay characteristics or chromatic dispersion characteristics of the device-under-test using the phase difference.

The present invention described in claim 3, is an apparatus for measuring optical characteristics as claimed in claim 2, wherein the transmitted light obtaining unit for measurement includes a first terminal for measurement into which a light is entered, a second terminal for measurement from which the light entered into the first terminal for measurement exits and into which a light is also entered, and a third terminal for measurement from which the light entered into the second terminal for measurement exits, wherein the transmitted light obtaining unit for reference includes a first terminal for reference into which a light is entered, a second terminal for reference from which the light entered into the first terminal for reference exits and into which a light is also entered, and third terminal for reference from which the light entered into the second terminal for reference exits, and wherein the incident light for reference is entered into the first terminal for measurement, the other end of the device-under-test is connected to the second terminal for measurement, the incident light for measurement is entered into the first terminal for reference, and the one end of the device-under-test is connected to the second terminal for reference.

The present invention described in claim 4, is an apparatus for measuring optical characteristics as claimed in claim 3, wherein the transmitted light obtaining unit for measurement and the transmitted light obtaining unit for reference are directional couplers.

The present invention described in claim 5, is an apparatus for measuring optical characteristics as claimed in claim 3, wherein the apparatus further includes: a photoelectric conversion unit for measurement that performs photoelectric conversion of the output of the third terminal for measurement, a photoelectric conversion unit for reference that performs photoelectric conversion of the output of the third terminal for reference, a phase comparison unit for detecting a phase difference between the phases of outputs of the photoelectric conversion unit for measurement and the photoelectric conversion unit for reference, and a characteristic calculation unit for calculating group delay characteristics or chromatic dispersion characteristics of the device-under-test using the phase difference.

According to the present invention described in claim 6, a method for measuring optical characteristics of a device-under-test which transmits a light, includes: a variable-wavelength light generating step for generating a variable-wavelength light, the wavelength of which is variable; a fixed-wavelength light generating step for generating a fixed-wavelength light, the wavelength of which is fixed; a first optical modulation step for casting an incident light for measurement on one end of the device-under-test, wherein the incident light for measurement is the variable-wavelength light subjected to intensity modulation to a predetermined frequency; a second optical modulation step for casting an incident light for reference to the other end of the device-under-test, wherein the incident light for reference is the fixed-wavelength light subjected to intensity modulation to a predetermined frequency; a transmitted light obtaining step for measurement that obtains a transmitted light for measurement, which is the incident light for measurement transmitted through the device-under-test; and a transmitted light obtaining step for reference that obtains a transmitted light for reference, which is the incident light for reference transmitted through the device-under-test, wherein the apparatus measures the characteristics of deviceunder-test based on the transmitted light for measurement and the transmitted light for reference.

The present invention described in claim 7, is a computer-readable medium having a program of instructions for execution by the computer to perform an optical characteristic measuring process for measuring a characteristic of a device-under-test which transmits a light, the optical characteristic measuring process including: a variable-wavelength light generating processing for generating a variable-wavelength light, the wavelength of which is variable; a fixed-wavelength light generating processing for generating a fixed-wavelength light, the wavelength of which is fixed; a first optical modulation processing for casting an incident light for measurement on one end of the device-under-test, wherein the incident light for measurement is the variable-wavelength light subjected to intensity modulation to a predetermined frequency; a second optical modulation processing for casting an incident light for reference to the other end of the device-under-test, wherein the incident light for reference is the fixed-wavelength light subjected to intensity modulation to a predetermined frequency; a transmitted light obtaining processing for measurement that obtains a transmitted light for measurement, which is the incident light for measurement transmitted through the device-under-test; and a transmitted light obtaining processing for reference that obtains a transmitted light for reference, which is the incident light for reference transmitted through the device-under-test, wherein the apparatus measures the characteristics of device-under-test based on the transmitted light for measurement and the transmitted light for reference.

According to the present invention described in claim 8, a method for measuring optical characteristics of a device-under-test which transmits a light, includes: a transmitted light obtaining step for measurement that obtains a transmitted light for measurement which is an incident light for measurement, transmitted through the device-under-test, wherein the incident light for measurement is a variable-wavelength light, the wavelength of which is variable, subjected to intensity modulation to a predetermined frequency and then cast on one end of the device-under-test; a transmitted light obtaining step for reference that obtains a transmitted light for reference which is an incident light for reference, transmitted through the device-under-test, wherein the incident light for reference is a fixed-wavelength light, the wavelength of which is fixed, subjected to intensity modulation to a predetermined frequency and then cast on the other end of the device-under-test; a photoelectric conversion step for measurement that performs photoelectric conversion of the transmitted light for measurement obtained by the transmitted light obtaining step for measurement; a photoelectric conversion step for reference that performs photoelectric conversion of the transmitted light for reference obtained by the transmitted light obtaining step for reference; a phase comparison step for detecting a phase difference between the phase of output of the photoelectric conversion step for measurement and the photoelectric conversion step for reference; and a characteristic calculation step for calculating group delay characteristics or chromatic dispersion characteristics of the device-under-test using the phase difference.

The present invention described in claim 9, is a computer-readable medium having a program of instructions for execution by the computer to perform an optical characteristic measuring process for measuring a characteristic of a device-under-test which transmits a light, the optical characteristic measuring process including: a transmitted light obtaining processing for measurement that obtains a transmitted light for measurement which is an incident light for measurement, transmitted through the device-under-test, wherein the incident light for measurement is a variable-wavelength light, the wavelength of which is variable, subjected to intensity modulation to a predetermined frequency and then cast on one end of the device-under-test; a transmitted light obtaining processing for reference that obtains a transmitted light for reference which is an incident light for reference, transmitted through the device-under-test, wherein the incident light for reference is a fixed-wavelength light, the wavelength of which is fixed, subjected to intensity modulation to a predetermined frequency and then cast on the other end of the device-under-test; a photoelectric conversion processing for measurement that performs photoelectric conversion of the transmitted light for measurement obtained by the transmitted light obtaining processing for measurement; a photoelectric conversion processing for reference that performs photoelectric conversion of the transmitted light for reference obtained by the transmitted light obtaining processing for reference; a phase comparison processing for detecting a phase difference between the phase of output of the photoelectric conversion processing for measurement and the photoelectric conversion processing for reference; and a characteristic calculation processing for calculating group delay characteristics or chromatic dispersion characteristics of the device-under-test using the phase difference.

DESCRIPTION OF THE PREFERRED EMBODIMENTS

Herein below, embodiments of the present invention will be explained with reference to the drawings.

Figure 1:
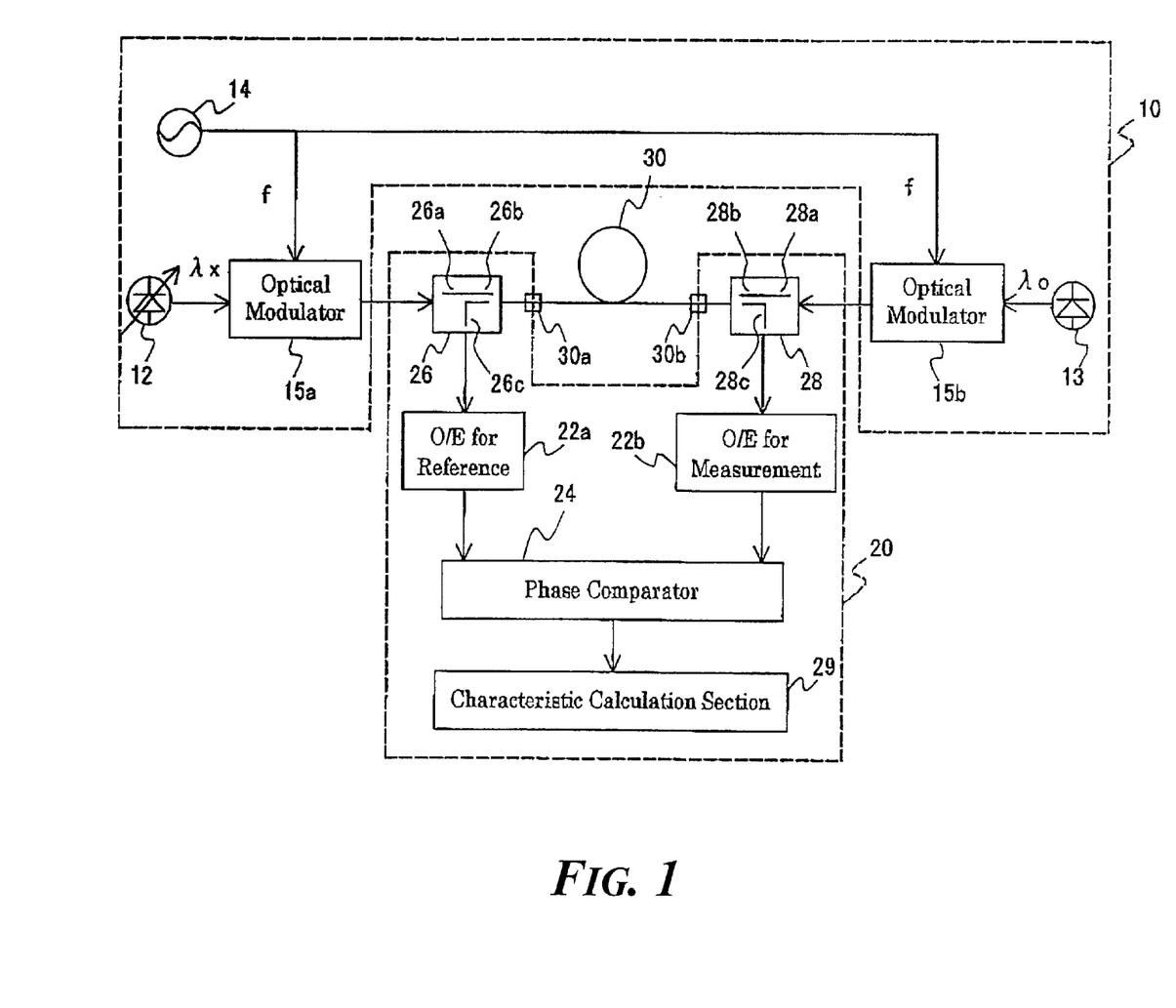
FIG. 1 is a block diagram showing the construction of an optical characteristic measuring apparatus related to an embodiment of the present invention.

FIG. 1 is a block diagram showing the construction of an optical characteristic measuring apparatus related to an embodiment of the present invention. The optical characteristic measuring apparatus comprises a light source system 10 for casting a light on an optical fiber 30 and a characteristic measuring system 20 for receiving the light transmitted through the optical fiber 30 and measuring the characteristics of optical fiber 30.

The optical fiber 30 has one end 30a and the other end 30b. In this embodiment, it is assumed that the optical fiber 30 is measured. However, the device-under-test may be anything that transmits a light, such as an optical fiber line formed by combining an optical amplifier to an optical fiber, and an optical fiber pair formed by combining the optical fiber line so that the flowing direction of light is reversed.

The light source system 10 comprises a variable-wavelength light source 12, a fixed-wavelength light source 13, an oscillator 14, a first optical modulator 15a, and a second optical modulator 15b.

The variable-wavelength light source 12 generates a variable-wavelength light, the wavelength of which is variable. The wavelength λx of variable-wavelength light can be swept by the variable-wavelength light source 12. The variable-wavelength light source 12 is connected to the one end 30a of optical fiber 30 through the first optical modulator 15a and a first directional coupler 26 to be explained herein after.

The fixed-wavelength light source 13 generates a fixed-wavelength light, the wavelength of which is fixed. It is desired to fix the wavelength of fixed-wavelength light to a wavelength λ0 at which the chromatic dispersion is minimized in the optical fiber 30. The fixed-wavelength light source 13 is connected to the other end 30b of optical fiber 30 through the second optical modulator 15b and a second directional coupler 28 to be explained herein after.

The oscillator 14 generates and supplies an electric signal of a predetermined frequency f to the first and second optical modulators 15a and 15b.

The first optical modulator 15a performs intensity modulation of variable-wavelength light to the frequency f. The second optical modulator 15b performs intensity modulation of fixed-wavelength light to the frequency f. The first optical modulator 15a and the second optical modulator 15b have lithium/niobate (LN). However, they may not have LN if they can perform intensity modulation of light. For example, they may be EA (Electro Absorption) modulators. The light subjected to intensity modulation by the first optical modulator 15a is referred to as incident light for measurement. The light subjected to intensity-modulation by the second optical modulator 15b is referred to as incident light for reference. The incident light for measurement is entered into the one end 30a of optical fiber 30. The incident light for reference is entered into the other end 30b of optical fiber 30.

The incident lights for measurement and reference entered into the optical fiber 30 are transmitted through the optical fiber 30. The incident light for measurement transmitted through the optical fiber 30 is referred to as transmitted light for measurement. The incident light for reference transmitted through the optical fiber 30 is referred to as transmitted light for reference.

The characteristic measuring system 20 comprises a photoelectric converter for reference 22a, a photoelectric converter for measurement 22b, a phase comparator 24, a first directional coupler 26, a second directional coupler 28, and a characteristic calculation section 29.

The first directional coupler 26 has a first terminal for reference 26a, a second terminal for reference 26b, and a third terminal for reference 26c. The first terminal for reference 26a is connected to the first optical modulator 15a. The second terminal for reference 26b is connected to the one end 30a of optical fiber 30. The third terminal for reference 26c is connected to the photoelectric converter for reference 22a.

The second directional coupler 28 has a first terminal for measurement 28a, a second terminal for measurement 28b, and a third terminal for measurement 28c. The first terminal for measurement 28a is connected to the second optical modulator 15b. The second terminal for measurement 28b is connected to the other end 30b of optical fiber 30. The third terminal for measurement 28c is connected to the photoelectric converter for measurement 22b.

Figure 2A:
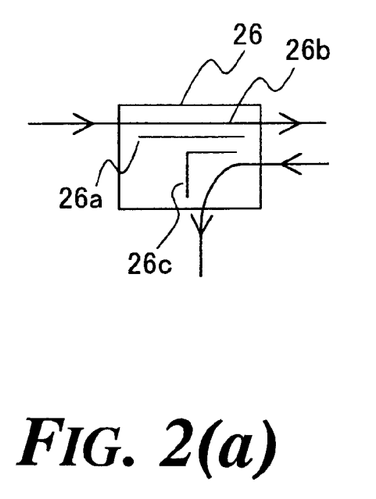
FIG. 2 shows the internal structure of a first directional coupler 26 and a second directional coupler 28.
Figure 2B:
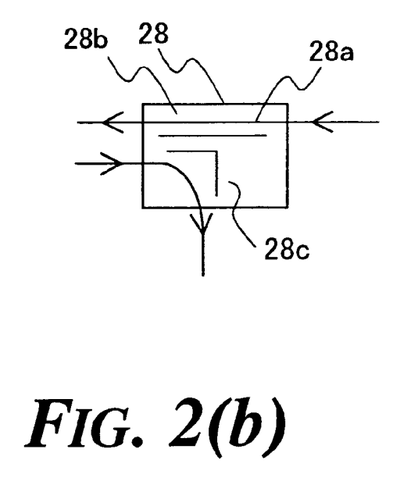

Here, the internal structures of the first directional coupler 26 and the second directional coupler 28 will be explained with reference to FIGS. 2(a) and 2(b). A light is entered into the first terminal for reference 26a. From the second terminal for reference 26b, the light entered into the first terminal for reference 26a exits. Furthermore, a light is also entered into the second terminal for reference 26b. From the third terminal for reference 26c, the light entered into the second terminal for reference 26b exits. A light is entered into the first terminal for measurement 28a. From the second terminal for measurement 28b, the light entered into the first terminal for measurement 28a exits. Furthermore, a light is also entered into (incident upon) the second terminal for measurement 28b. From the third terminal for measurement 28c, the light entered into the second terminal for measurement 28b exits.

The photoelectric converter for reference 22a performs photoelectric conversion of the light outputted from the third terminal for reference 26c and outputs it. The photoelectric converter for measurement 22b performs photoelectric conversion of the light outputted from the third terminal for measurement 28c and outputs it. The phase comparator 24 measures the phase of an electric signal generated by the photoelectric converter for measurement 22b, on the basis of an electric signal generated by the photoelectric converter for reference 22a.

The characteristic calculation section 29 calculates either group delay characteristics or chromatic dispersion characteristics of optical fiber 30 based on the phase measured by the phase comparator 24. The group delay characteristics can be calculated from the relationship between the phase measured by the phase comparator 24 and the modulated frequency f. The chromatic dispersion characteristics can be calculated by differentiating the group delay characteristic with wavelength.

Figure 3:
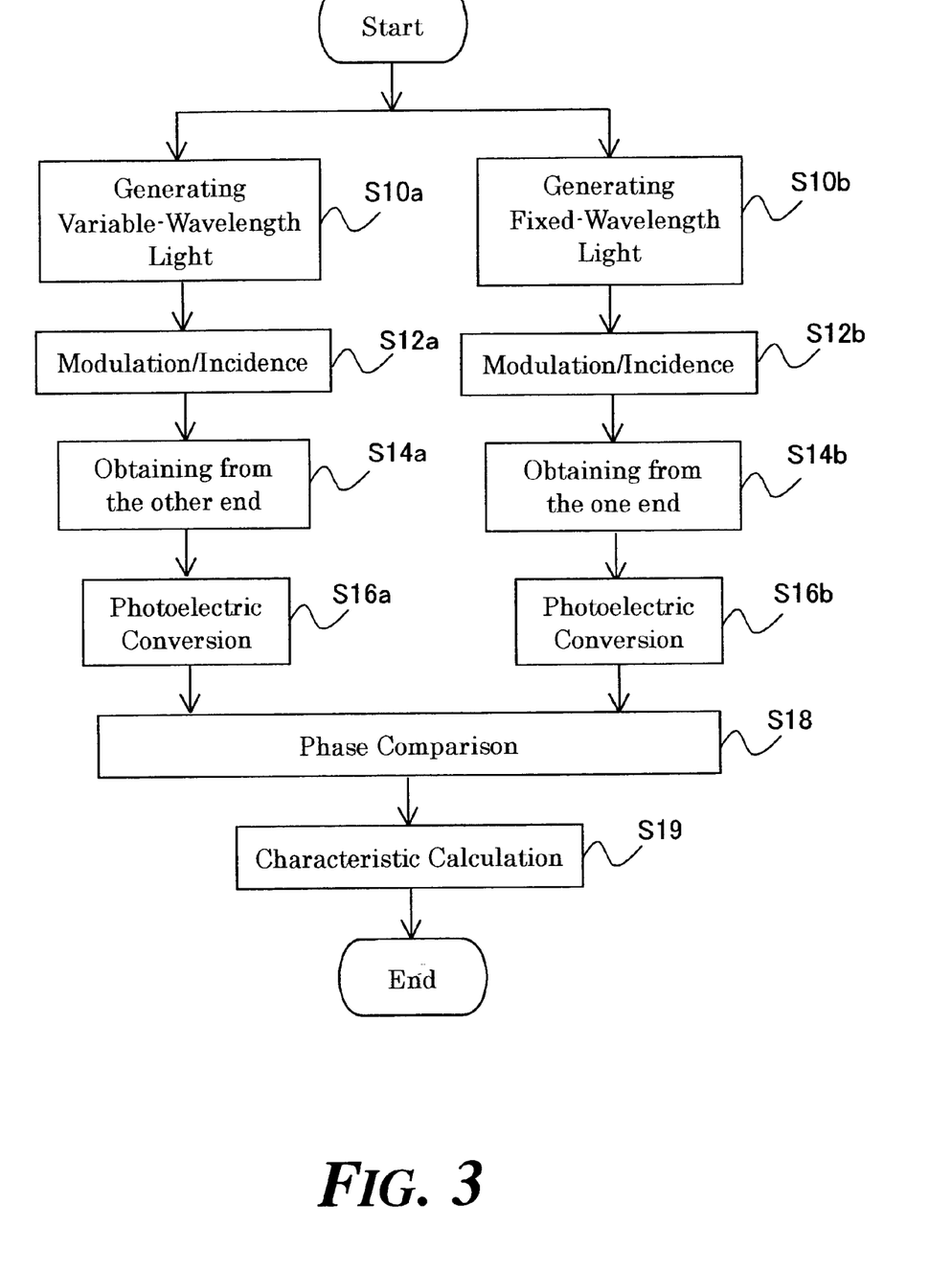
FIG. 3 is a flowchart showing the operation of the embodiment of the present invention.

Next, the operation in the embodiment of the present invention will be explained with reference to the flowchart of FIG. 3. Firstly, a variable-wavelength light ($\lambda=\lambda x$) is generated from the variable-wavelength light source 12 (S10a) and a fixed-wavelength light ($\lambda=\lambda 0$) is generated from the fixed-wavelength light source 13 (S10b). Next, the first optical modulator 15a performs intensity modulation of the variable-wavelength light to a frequency f, and the variable-wavelength light is transmitted from the first terminal for reference 26a of first directional coupler 26 and through the second terminal for reference 26b, and entered into the one end 30a of optical fiber 30 (S12a). The second optical modulator 15b performs intensity modulation of the fixed-wavelength light to a frequency f, and the fixed-wavelength light is transmitted from the first terminal for measurement 28a of second directional coupler 28 and through the second terminal for measurement 28b, and entered into the other end 30b of optical fiber 30 (S12b).

The incident light for measurement entered into the one end 30a of optical fiber 30 is transmitted through the optical fiber 30 and exits from the other end 30b as transmitted light for measurement. The transmitted light for measurement enters into the second terminal for measurement 28b of the second directional coupler 28 and exits from the third terminal for measurement 28c. In this manner, the transmitted light for measurement is obtained from the other end 30b (S14a). Due to this operation, the second directional coupler 28 is corresponding to the transmitted light obtaining means for measurement.

The incident light for reference entered into the other end 30b of optical fiber 30 is transmitted through the optical fiber 30 and exits from the one end 30a as transmitted light for reference. The transmitted light for reference is entered into the second terminal for reference 26b of the first directional coupler 26 and exits from the third terminal for reference 26c. In this manner, the transmitted light for reference is obtained from the one end 30a (S14b). Due to this operation, the first directional coupler 26 is corresponding to the transmitted light obtaining means for reference.

The transmitted light for measurement obtained from the other end 30b is subjected to photoelectric conversion by the photoelectric converter for measurement 22b (S16a), and the transmitted light for reference obtained from the one end 30a is subjected to photoelectric conversion by the photoelectric converter for reference 22a (S16b).

Next, the phase comparator 24 measures the phase of an electric signal generated by the photoelectric converter for measurement 22b on the basis of an electric signal generated by the photoelectric converter for reference 22a (S18). And, it calculates either group delay characteristics or chromatic dispersion characteristics of optical fiber 30 based on the measured phase. The group delay characteristics can be calculated from the relationship between the phase measured by the phase comparator 24 and the modulated frequency f. The chromatic dispersion characteristics can be calculated by differentiating the group delay characteristic with wavelength (S19).

According to the embodiment of the present invention, the variable-wavelength light is transmitted from the one end 30a to the other end 30b of optical fiber 30, and the fixed-wavelength light is transmitted from the other end 30b to the one end 30a of optical fiber 30. Therefore, it is possible to separately obtain the variable-wavelength light and fixed-wavelength light regardless of wavelengths thereof. Thus, it is possible to perform the measurement of chromatic dispersion, even if the wavelength of variable-wavelength light source and that of fixed-wavelength light source for reference are identical with each other. Also, the transmitted light for measurement is influenced by the chromatic dispersion and the expansion and contraction of optical fiber 30. The transmitted light for reference is influenced only by the expansion and contraction of optical fiber 30. This is because $\lambda 0$ is the wavelength at which the chromatic dispersion is minimized in the optical fiber 30. Therefore, if the phase difference between the transmitted light for measurement and the transmitted light for reference is detected, it is possible to exclude the influence of the expansion and contraction of optical fiber 30.

In addition, this embodiment can be implemented as follows. A media reading apparatus of computer comprising a CPU, a hard disk, and a media reading apparatus (floppy disk, CD-ROM and the like) is rendered to read a media recorded with a program for implementing each of the above-mentioned sections and to install it in the hard disk. In this manner, the above functions can be implemented.

According to the present invention, the variable-wavelength light is transmitted from the one end to the other end of device-under-test, and the fixed-wavelength light is transmitted from the other end to the one end of device-under-test. Therefore, it is possible to separately obtain the variable-wavelength light and fixed-wavelength light regardless of wavelengths thereof. Accordingly, it is possible to perform the measurement of chromatic dispersion even if the wavelength of variable-wavelength light source and the wavelength of fixed-wavelength light source for reference are identical with each other.

What is claimed is:

1. An apparatus for measuring optical characteristics of a device-under-test which transmits a light, comprising:
   a variable-wavelength light source for generating a variable-wavelength light, the wavelength of which is variable;
   a fixed-wavelength light source for generating a fixed-wavelength light, the wavelength of which is fixed;
   a first optical modulation means for casting an incident light for measurement on one end of said device-under-test, wherein the incident light for measurement is said variable-wavelength light subjected to intensity modulation to a predetermined frequency;
   a second optical modulation means for casting an incident light for reference to the other end of said device-under-test, wherein the incident light for reference is said fixed-wavelength light subjected to intensity modulation to a predetermined frequency;
   a transmitted light obtaining means for measurement that obtains a transmitted light for measurement, which is the incident light for measurement transmitted through the device-under-test; and
   a transmitted light obtaining means for reference that obtains a transmitted light for reference, which is the incident light for reference transmitted through the device-under-test,
   wherein the apparatus measures said characteristics of device-under-test based on said transmitted light for measurement and said transmitted light for reference.

2. An apparatus for measuring optical characteristics of a device-under-test which transmits a light, comprising:
   a transmitted light obtaining means for measurement that obtains a transmitted light for measurement which is an incident light for measurement, transmitted through said device-under-test, wherein the incident light for measurement is a variable-wavelength light, the wavelength of which is variable, subjected to intensity modulation to a predetermined frequency and then cast on one end of said device-under-test;
   a transmitted light obtaining means for reference that obtains a transmitted light for reference which is an incident light for reference, transmitted through said device-under-test, wherein the incident light for reference is a fixed-wavelength light, the wavelength of which is fixed, subjected to intensity modulation to a predetermined frequency and then cast on the other end of said device-under-test;
   a photoelectric conversion means for measurement that performs photoelectric conversion of said transmitted light for measurement obtained by said transmitted light obtaining means for measurement;
   photoelectric conversion means for reference that performs photoelectric conversion of said transmitted light for reference obtained by said transmitted light obtaining means for reference;
   a phase comparison means for detecting a phase difference between the phase of output of said photoelectric conversion means for measurement and said photoelectric conversion means for reference; and
   a characteristic calculation means for calculating group delay characteristics or chromatic dispersion characteristics of the device-under-test using said phase difference.

3. An apparatus for measuring optical characteristics as claimed in claim 2, wherein said transmitted light obtaining means for measurement comprises a first terminal for measurement into which a light is entered, a second terminal for measurement from which the light entered into said first terminal for measurement exits and into which a light is also entered, and a third terminal for measurement from which the light entered into said second terminal for measurement exits,
   wherein said transmitted light obtaining means for reference comprises a first terminal for reference into which a light is entered, a second terminal for reference from which the light entered into said first terminal for reference exits and into which a light is also entered, and third terminal for reference from which the light entered into said second terminal for reference exits, and
   wherein said incident light for reference is entered into said first terminal for measurement, the other end of said device-under-test is connected to said second terminal for measurement, said incident light for measurement is entered into said first terminal for reference, and the one end of said device-under-test is connected to said second terminal for reference.

4. An apparatus for measuring optical characteristics as claimed in claim 3, wherein said transmitted light obtaining means for measurement and said transmitted light obtaining means for reference are directional couplers.

5. An apparatus for measuring optical characteristics as claimed in claim 3, wherein the apparatus further comprises:
   a photoelectric conversion means for measurement that performs photoelectric conversion of the output of said third terminal for measurement,
   a photoelectric conversion means for reference that performs photoelectric conversion of the output of said third terminal for reference,
   a phase comparison means for detecting a phase difference between the phases of outputs of said photoelectric conversion means for measurement and said photoelectric conversion means for reference, and
   a characteristic calculation means for calculating group delay characteristics or chromatic dispersion characteristics of the device-under-test using said phase difference.

6. A method for measuring optical characteristics of a device-under-test which transmits a light, comprising:
   a variable-wavelength light generating step for generating a variable-wavelength light, the wavelength of which is variable;
   a fixed-wavelength light generating step for generating a fixed-wavelength light, the wavelength of which is fixed;
   a first optical modulation step for casting an incident light for measurement on one end of said device-under-test, wherein the incident light for measurement is said variable-wavelength light subjected to intensity modulation to a predetermined frequency;
   a second optical modulation step for casting an incident light for reference to the other end of said device-under-test, wherein the incident light for reference is said fixed-wavelength light subjected to intensity modulation to a predetermined frequency;
   a transmitted light obtaining step for measurement that obtains a transmitted light for measurement, which is the incident light for measurement transmitted through the device-under-test; and
   a transmitted light obtaining step for reference that obtains a transmitted light for reference, which is the incident light for reference transmitted through the device-under-test, wherein the apparatus measures said characteristics of device-under-test based on said transmitted light for measurement and said transmitted light for reference.

7. A computer-readable medium having a program of instructions for execution by the computer to perform an optical characteristic measuring process for measuring a characteristic of a device-under-test which transmits a light, said optical characteristic measuring process comprising:

a variable-wavelength light generating processing for generating a variable-wavelength light, the wavelength of which is variable;

a fixed-wavelength light generating processing for generating a fixed-wavelength light, the wavelength of which is fixed;

a first optical modulation processing for casting an incident light for measurement on one end of said device-under-test, wherein the incident light for measurement is said variable-wavelength light subjected to intensity modulation to a predetermined frequency;

second optical modulation processing for casting an incident light for reference to the other end of said device-under-test, wherein the incident light for reference is said fixed-wavelength light subjected to intensity modulation to a predetermined frequency;

a transmitted light obtaining processing for measurement that obtains a transmitted light for measurement, which is the incident light for measurement transmitted through the device-under-test; and a transmitted light obtaining processing for reference that obtains a transmitted light for reference, which is the incident light for reference transmitted through the device-under-test, wherein the apparatus measures said characteristics of device-under-test based on said transmitted light for measurement and said transmitted light for reference.

8. A method for measuring optical characteristics of a device-under-test which transmits a light, comprising:

a transmitted light obtaining step for measurement that obtains a transmitted light for measurement which is an incident light for measurement, transmitted through said device-under-test, wherein the incident light for measurement is a variable-wavelength light, the wavelength of which is variable, subjected to intensity modulation to a predetermined frequency and then cast on one end of said device-under-test;

a transmitted light obtaining step for reference that obtains a transmitted light for reference which is an incident light for reference, transmitted through said device-under-test, wherein the incident light for reference is a fixed-wavelength light, the wavelength of which is fixed, subjected to intensity modulation to a predetermined frequency and then cast on the other end of said device-under-test;

a photoelectric conversion step for measurement that performs photoelectric conversion of said transmitted light for measurement obtained by said transmitted light obtaining step for measurement;

a photoelectric conversion step for reference that performs photoelectric conversion of said transmitted light for reference obtained by said transmitted light obtaining step for reference;

a phase comparison step for detecting a phase difference between the phase of output of said photoelectric conversion step for measurement and said photoelectric conversion step for reference; and a characteristic calculation step for calculating group delay characteristics or chromatic dispersion characteristics of the device-under-test using said phase difference.

9. A computer-readable medium having a program of instructions for execution by the computer to perform an optical characteristic measuring process for measuring a characteristic of a device-under-test which transmits a light, said optical characteristic measuring process comprising:

a transmitted light obtaining processing for measurement that obtains a transmitted light for measurement which is an incident light for measurement, transmitted through said device-under-test, wherein the incident light for measurement is a variable-wavelength light, the wavelength of which is variable, subjected to intensity modulation to a predetermined frequency and then cast on one end of said device-under-test;

a transmitted light obtaining processing for reference that obtains a transmitted light for reference which is an incident light for reference, transmitted through said device-under-test, wherein the incident light for reference is a fixed-wavelength light, the wavelength of which is fixed, subjected to intensity modulation to a predetermined frequency and then cast on the other end of said device-under-test;

a photoelectric conversion processing for measurement that performs photoelectric conversion of said transmitted light for measurement obtained by said transmitted light obtaining processing for measurement;

a photoelectric conversion processing for reference that performs photoelectric conversion of said transmitted light for reference obtained by said transmitted light obtaining processing for reference;

a phase comparison processing for detecting a phase difference between the phase of output of said photoelectric conversion processing for measurement and said photoelectric conversion processing for reference; and a characteristic calculation processing for calculating group delay characteristics or chromatic dispersion characteristics of the device-under-test using said phase difference.

* * * * *